United States Patent
Gurreri et al.

(10) Patent No.: US 8,425,125 B2
(45) Date of Patent: Apr. 23, 2013

(54) PROTECTIVE COVER FOR FIELD-INSTALLABLE CONNECTOR

(75) Inventors: Michael Lawrence Gurreri, York, PA (US); David Donald Erdman, Hummelstown, PA (US); Eric James Hopkins, Liverpool, PA (US); Douglas Harold Rohde, York, PA (US); Joen Verweyen, Zoutleeuw (BE); Daniel Daems, Gravenwezel (BE)

(73) Assignee: Tyco Electronics Corporation, Middletown, PA (US)

( * ) Notice: Subject to any disclaimer, the term of this patent is extended or adjusted under 35 U.S.C. 154(b) by 119 days.

(21) Appl. No.: 13/168,328

(22) Filed: Jun. 24, 2011

(65) Prior Publication Data

US 2011/0271525 A1  Nov. 10, 2011

Related U.S. Application Data

(62) Division of application No. 12/017,214, filed on Jan. 21, 2008, now Pat. No. 7,988,367.

(51) Int. Cl.
G02B 6/36 (2006.01)
G02B 6/38 (2006.01)
G02B 6/00 (2006.01)

(52) U.S. Cl.
USPC ................. 385/53; 385/75; 385/78

(58) Field of Classification Search ............... None
See application file for complete search history.

(56) References Cited

U.S. PATENT DOCUMENTS

| | | | | |
|---|---|---|---|---|
| 5,040,867 A * | 8/1991 | de Jong et al. | ............ | 385/60 |
| 5,142,598 A * | 8/1992 | Tabone | ............ | 385/78 |
| 5,414,790 A * | 5/1995 | Lee et al. | ............ | 385/139 |
| 6,227,717 B1 * | 5/2001 | Ott et al. | ............ | 385/53 |
| 6,628,878 B2 * | 9/2003 | Akeda et al. | ............ | 385/134 |
| 7,565,053 B2 * | 7/2009 | Zimmel et al. | ............ | 385/139 |
| 2003/0002812 A1 * | 1/2003 | Lampert | ............ | 385/78 |
| 2004/0105625 A1 * | 6/2004 | Ueda et al. | ............ | 385/78 |
| 2007/0127873 A1 | 6/2007 | Manning et al. | | |
| 2008/0304804 A1 * | 12/2008 | Zimmel et al. | ............ | 385/139 |

* cited by examiner

Primary Examiner — Uyen Chau N Le
Assistant Examiner — Chris Chu

(57) ABSTRACT

A method of terminating a fiber in a connector having a front and rear orientation, a housing, a clamping mechanism in the housing, and a ferrule assembly forward of the clamping mechanism and comprising a holder and a ferrule extending from the holder, the method comprising covering the ferrule with a cap, inserting a fiber into the clamping mechanism from the rear of the connector, and while the cap is on the ferrule, actuating the clamping mechanism to secure the fiber to the connector by urging the cap rearward relative to the clamping mechanism.

13 Claims, 4 Drawing Sheets

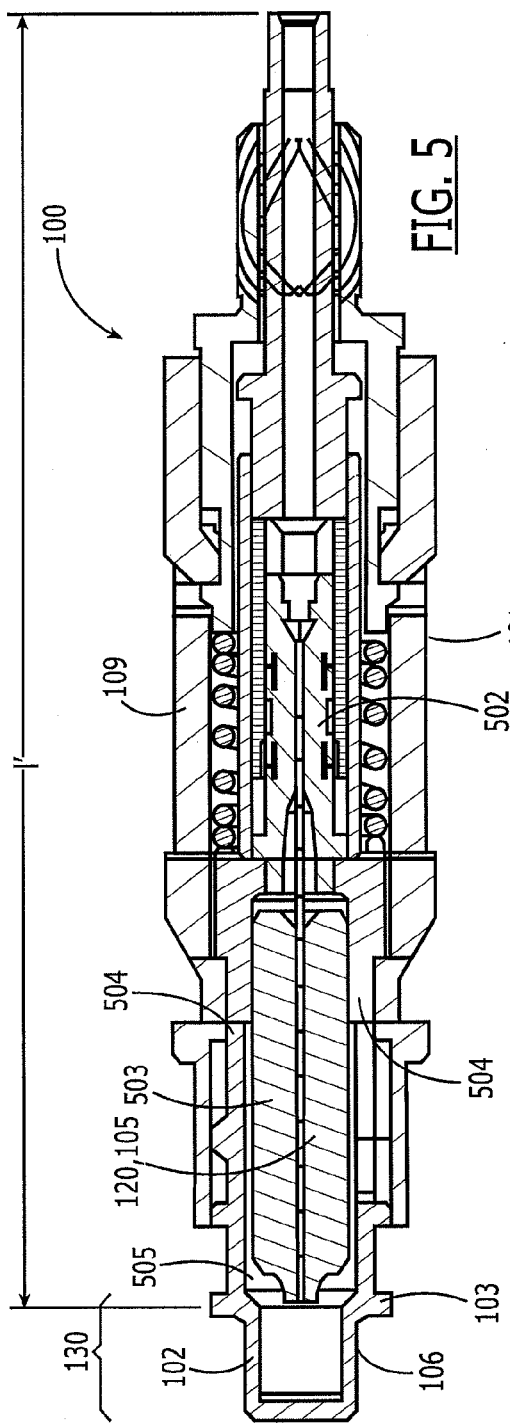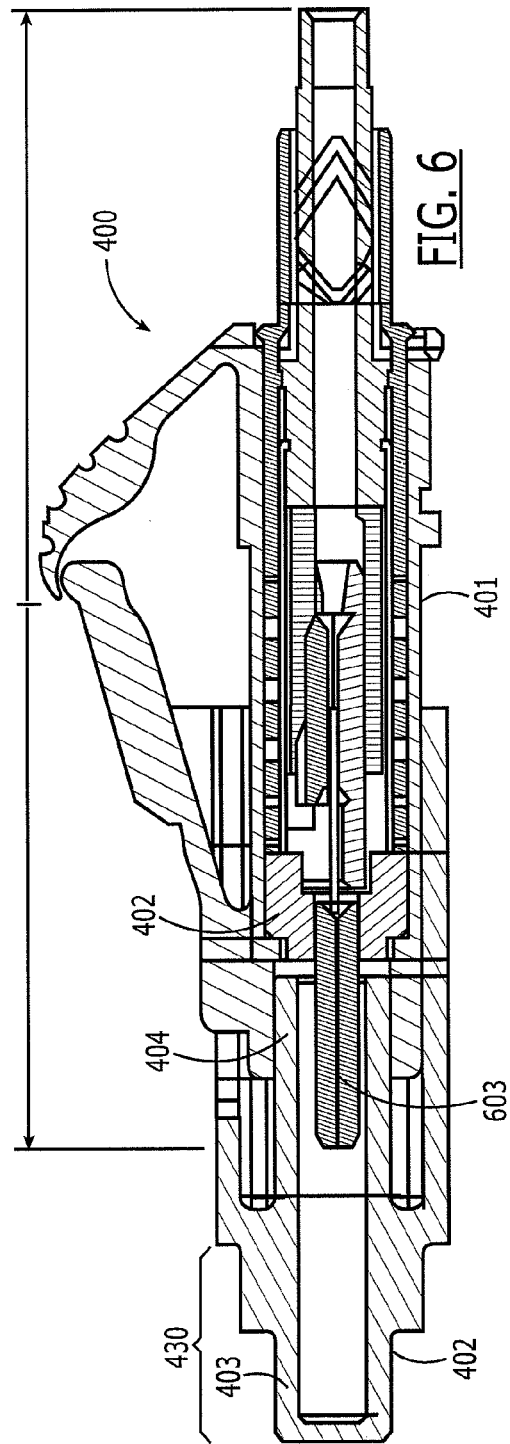

PROTECTIVE COVER FOR FIELD-INSTALLABLE CONNECTOR

REFERENCE TO RELATED APPLICATIONS

This application is a divisional of U.S. application Ser. No. 12/017,214 filed Jan. 21, 2008, which is incorporated by reference in its entirety.

FIELD OF INVENTION

The present invention relates generally to a protective cap for the ferrule of a fiber optic connector, and, more specifically, to a robust ferrule cap for a field-installable fiber optic connector that remains in situ during fiber termination.

BACKGROUND OF INVENTION

Optical fiber connectors are an essential part of practically all optical fiber communication systems. For instance, such connectors are used to join segments of fiber into longer lengths, to connect fiber to active devices such as radiation sources, detectors and repeaters, and to connect fiber to passive devices such as switches and attenuators. The principal function of an optical fiber connector is to optically couple a fiber with the mating device (e.g., another fiber, an active device or a passive device). This is achieved by holding the end of the fiber such that the core of the fiber is axially aligned with the optical pathway of the mating device.

To facilitate an effective optical coupling, the end face of the ferrule is typically polished. This is usually performed in a controlled setting wherein precision equipment and skilled personnel are available to cleave the fiber, terminate it in a ferrule, and polish the ferrule to exacting tolerances. Frequently, however, connectors must be terminated in the field where such facilities and personnel are not available. Under these conditions, it is desirable to omit the step of the polishing the ferrule by instead terminating the fiber in a connector which has a fiber stub already terminated and polished in a ferrule. The terminating fiber is optically coupled to the fiber stub in the connector, often with the use of a refractive index matched gel to improve optical coupling therebetween.

The terminating fiber is held in intimate contact with the fiber stub by virtue of a clamping mechanism, which applies a radial force to the terminating fiber to secure it to the connector. Advantageously, this clamping mechanism facilitates straightforward field assembly by obviating the need to handle epoxy and for curing ovens during field termination.

Tyco Electronics (Harrisburg, Pa.) offers a family of field-installable connectors that are axially-actuated (see, for example, U.S. Ser. application No. 20070127873, which is hereby incorporated by reference). Each connector comprises a connector housing, a ferrule assembly having a ferrule which projects from the front of the connector housing, a fiber stub which is contained in the ferrule and extends from the back of the ferrule assembly, a clamping mechanism behind the ferrule assembly into which the back end of the fiber stub extends, and a spring in the connector housing to bias the combination of the ferrule assembly and the clamping mechanism forward relative to the connector housing. The clamping mechanism comprises camming means and a plunger to actuate the camming means. These field-installable connectors are available as SC, LC and ST type connectors.

Termination of a fiber in a field-installable connector is typically performed using a tool resembling a pair of pliers. Specifically, the pliers comprise two arms that urge together when the tool is actuated or squeezed. One arm comprises a die, which is configured to receive the ferrule of the connector, while the other arm comprises a die that is configured to receive the plunger. After the fiber is inserted in the back of the connector and into the clamping mechanism, the unactuated connector is disposed in the pliers and they are squeezed causing the two arms to draw together, thereby urging the ferrule assembly back into the plunger. Because the clamping mechanism is sandwiched between these two components, the cam means are actuated by the plunger, and the fiber is secured to the clamping mechanism. Once released, the ferrule assembly returns to its forwardly-biased position within the housing.

Although field termination using the system described above is convenient, Applicants have nevertheless identified a number of shortcomings. For example, typically, there is a protective dust cover or cap on the ferrule that must be removed prior to actuation. Removing the protective cap prior to actuation, however, is undesirable for a number of reasons. First, it presents an opportunity for the ferrule to be damaged or otherwise compromised by the crimping tool. Likewise, during this procedure, debris may be deposited on the end face of the ferrule thereby diminishing its optical performance. Furthermore, removing the cap necessarily requires putting it back, thus, creating additional steps and the chance that the installer may simply forget to do so, thereby leaving the ferrule unprotected after fiber termination.

Therefore, what is needed is an approach for terminating a field-installable connector that does not subject the ferrule to damage and or debris by removing the cap. The present invention fulfills this need among others.

SUMMARY OF THE INVENTION

The present invention provides a robust cap for a field-installable connector that remains in place during termination of the fiber to the connector. Specifically, Applicants have designed a cap that can withstand the forces inherent in actuating a clamping mechanism and, thus, can remain in place during termination. The cap not only remains in place during actuation, but also is configured to translate the compressive load away from the ferrule and direct it instead to the ferrule holder of the ferrule assembly, thereby minimizing stresses on the ferrule itself.

Applicants also recognize that, by leaving the cap in place during fiber termination, standardization in connector termination apparatus can be facilitated. More specifically, there are two factors that essentially determine the configuration of the die set for the crimping tool. The first is the distance between the ferrule tip and the end of the plunger prior to actuation of the connector. This is referred to herein as the "un-actuated connector length." This length tends to be different for different connector types, thus requiring different die sets to accommodate the difference. The other factor is the geometry of the front of the connector that is received in the die of the first arm. More specifically, different ferrule arrangements and different housing front ends require dies having customized recesses to receive them.

Applicants realized that by leaving the cap in situ during fiber termination, differences between the unactuated connector length and the front-end geometry could be accommodated by the cap. For example, if one connector has a shorter unactuated length than another connector, one cap can be made longer to make up the difference. Likewise, since the cap is disposed at the front end of the connector, it can define a common front-end geometry among different connectors. Accordingly, rather than having different die sets for different connectors, different protective caps can be used to standardize the unactuated length of the connector and its front-end geometry, thus allowing a set of common dies to be used for different connectors.

Accordingly, one aspect of the present invention is a protective ferrule cap that is configured to remain in place during fiber termination in a connector. The connector has a front and rear orientation, a housing, an axially-actuated clamping mechanism in the housing, and a ferrule assembly forward of the clamping mechanism and forwardly biased in the housing, the ferrule assembly comprising a holder and a ferrule extending from the holder. In one embodiment, the cap comprises: (a) a front end defining a cavity for receiving the ferrule and having an outer surface defining at least part of a front-end geometry; (b) a back end defining an opening through which the ferrule is received and a perimeter around the opening, the perimeter configured to contact the holder when the cap is pushed rearward in the housing, the front and back ends being unitary such that any rearward force on the front end is transferred to the back end and through the perimeter to the holder; and (c) a retention portion for contacting the housing to secure the cap to the housing.

Another aspect of the invention is a family of protective caps for different connectors that standardize the connectors' unactuated length and front-end geometry. Specifically, each connector has a front and rear orientation, a housing, an axially-actuated clamping mechanism in the housing, and a ferrule assembly forward of the clamping mechanism and forwardly biased in the housing, the ferrule assembly comprising a holder and a ferrule extending from the holder, each connector having a different unactuated length and a front face. In one embodiment, the family of caps comprises: different caps, each different cap corresponding to one of the different connectors, and comprising at least, a front end defining a cavity for receiving the ferrule and having an outer surface defining at least part of a front-end geometry; a back end defining an opening through which the ferrule is received and a perimeter around the opening, the perimeter configured to contact the holder, the front and back end being unitary such that any rearward axial force on the front end is transferred to the back end and through the perimeter to the holder; and a retention portion for contacting the housing to secure the cap to the housing; wherein the distance from the front end to back end for each different cap is different, but the front-end geometry of each different cap is essentially the same, wherein the different connectors with their corresponding cap have a common unactuated length and a common first end geometry such that they are received in a common crimp tool.

Yet another aspect of the present invention is a method of terminating a connector with a protective cap in place. In one embodiment, the method comprises: (a) providing a connector having a front and rear orientation, a housing, a clamping mechanism in the housing, and a ferrule assembly forward of the clamping mechanism and comprising a holder and a ferrule extending from the holder, the ferrule being covered by a cap; (b) inserting a fiber into the clamping mechanism from the rear of the connector; and (c) while the cap is on the ferrule, actuating the clamping mechanism to secure the fiber to the connector by urging the cap rearward relative to the clamping mechanism.

BRIEF DESCRIPTION OF DRAWINGS

FIG. 5 shows a cross section of the assembly of FIG. 1.

FIG. 6 shows a cross section of the assembly of FIG. 4.

DETAILED DESCRIPTION

Figure 1:
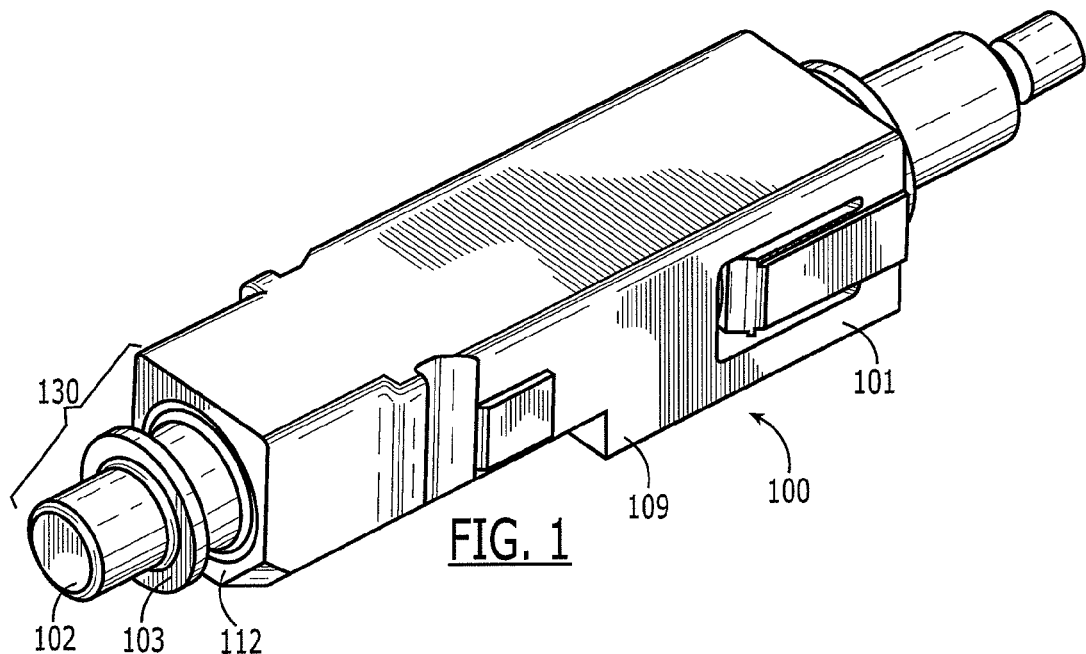
FIG. 1 shows an assembly of an SC connector and a preferred embodiment of the cap of the present invention.
Figure 2:
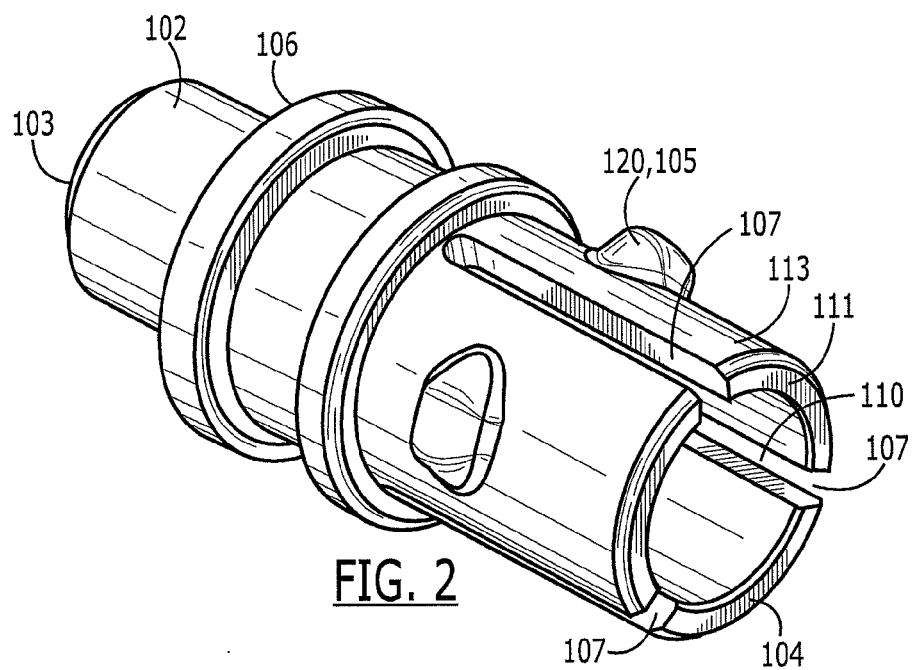
FIG. 2 shows a perspective view of the cap of FIG. 1.
Figure 3:
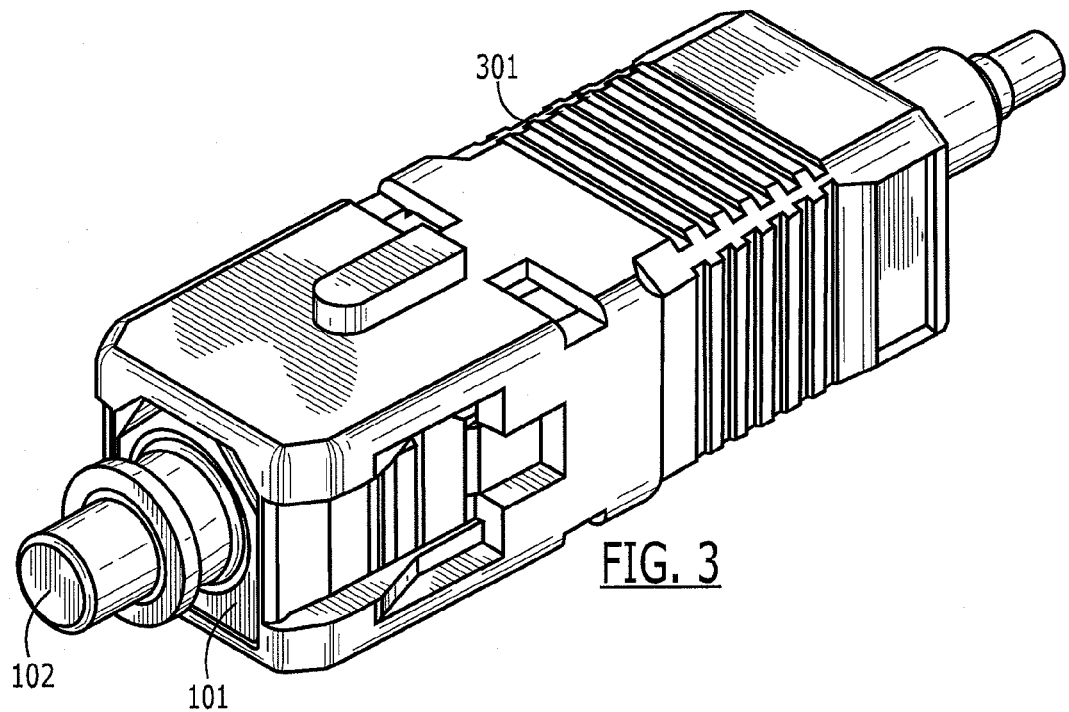
FIG. 3 shows an assembly of the cap of FIG. 1 with an SC connector having an outer housing.
Figure 4:
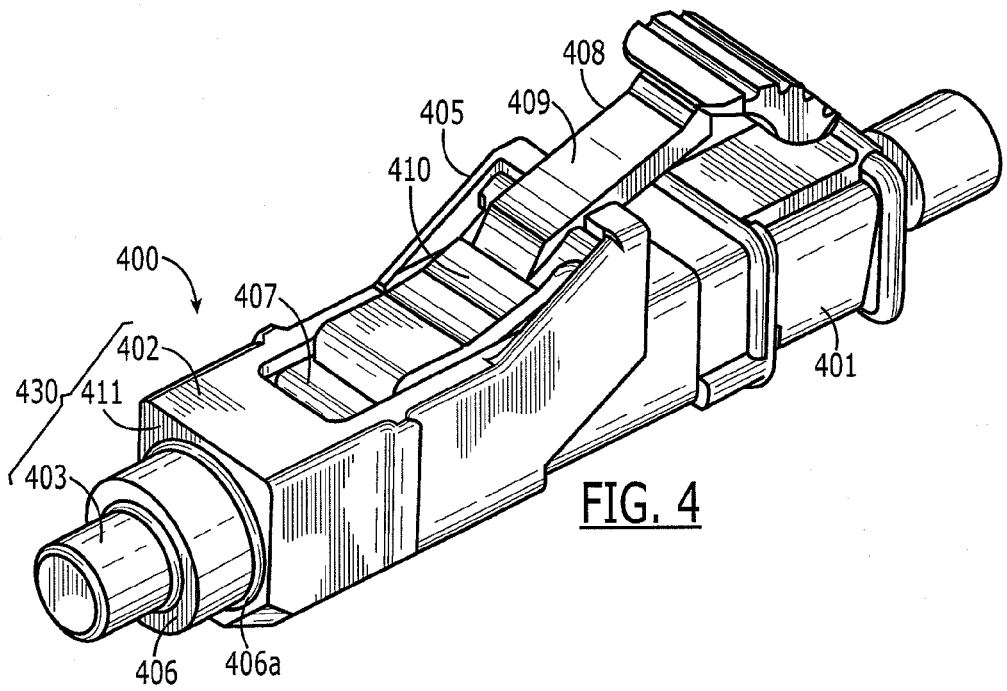
FIG. 4 shows an assembly of an LC connector and a preferred embodiment of the cap of the present invention.

Referring to FIGS. 1, 2, and 5, an assembly 100 of a cap 102 on a field-installable optical connector 101 is shown. The connector 101 has a housing 109 having a front and rear orientation and containing an axially-actuated clamping mechanism 502. Also in the housing is a ferrule assembly 501 forward of the clamping mechanism and forwardly biased in the housing 109. The ferrule assembly 501 comprises a holder 504 and a ferrule 503 extending from the holder. Although an SC connector is depicted in these figures, the cap of the present invention can be used with any field-installable connector. For example, as shown in the assembly 400 of FIG. 4, the cap can be used with an LC type connector 401 as shown in FIG. 4. These are two well known connectors the details of which will not be considered herein.

The cap 102 comprises a front end 103 defining a cavity 505 for receiving the ferrule 503 and an outer surface 106 defining at least part of a front-end geometry 130. The cap 102 also comprises a back end 104 defining an opening 110 through which the ferrule 503 is received and a perimeter 111 around the opening. The perimeter 111 is configured to contact the ferrule holder 504. The front and back ends 103, 104 are unitary such that any rearward axial force on the front end is transferred to the back end and through the perimeter to the holder 504. The cap 102 also has a retention portion 120 for contacting the connector housing 109 to secure the cap to the connector. The features of the cap are considered below in detail in addition to a method of terminating the fiber in the connector using the cap and a system for standardizing connectors using the caps.

The front end 103 functions to both cover and protect the ferrule and to define, at least in part, a front-end geometry 130 with its outer surface 106. The front end 103 protects the ferrule by covering it entirely or almost entirely. Preferably, although not necessarily, the cap avoids contact with the ferrule to avoid damaging it. The front end of the cap may define the entire front-end geometry, or it may define part of the front-end geometry. As used herein, the front-end geometry is the shape of the cap and possibly the connector that is received in a crimp tool die described below. Specifically, referring to FIG. 4, cap 402 covers the entire front end of the LC connector 401 and thus defines the entire front-end geometry 430. On the other hand, referring to FIG. 1, the front end 103 of cap 102 cooperates with a front face 112 of the SC connector 102 to define the entire front-end geometry 130.

The front-end geometry 106 is important because the crimping tool used to actuate the connector comprises a die that is configured with a corresponding geometry to receive that the front end of the connector. The cap of the present invention allows the front-end geometry to be standardized. In this regard, it is interesting to note that a portion 406a of the outer surface 406 (see FIG. 4) is configured to mimic the front face 112 of the SC connector 102 (see FIG. 1). Because the front-end geometry of the connector/cap assembly is common among different connector types, a common crimp tool and die can be used to actuate different connectors.

The rear end 104 of the cap functions to seat against a portion of the connector, other than the ferrule, to translate forces applied at the front end to the connector. It is well known that ferrules are sensitive components, which may break or otherwise be compromised if subjected to excessive force. To avoid this, the cap of the present invention avoids channeling compressive loads through the ferrule during actuation. Referring to FIGS. 2 and 5, the perimeter 111 of the rear end 104 is configured to seat on the holder 504, around the ferrule 503. This way, any force applied to cap is translated from the front end 103 and through the rear end 104 into the holder, which then is pushed rearward during the actuation process as described above.

To facilitate this force transfer, the front end 103 and rear end 104 are unitary, meaning they are either integrally molded or assembled into a single component with essentially no relative movement allowed between them. Preferably, the front and rear ends are integrally molded.

Referring to the LC embodiment in FIG. 6, the rear end 404 extends rearward from the front end 403 and is configured to seat against the ferrule holder 602 once the cap 402 is pushed rearward during actuation. This way, forces applied to the front end 403 are transferred to the rear portion 404 and into the ferrule holder 602. Therefore, with both the SC and LC connector cap embodiments, the actuating force is not transferred through the ferrule 503, 603, respectively.

In general, the cap must be capable of withstanding compressive loads and, thus, tends to be noncompliant. As used herein, the term non-compliance refers to a material having a compression modulus greater than 3000 MPa for common cap geometries. Preferably, the material is also capable of being injection molded to facilitate economical manufacturing. Suitable materials include, for example, polyetherimide or polybutylene terephthalate. Preferably, the material is A glass-filled Ultem resin.

The retention portion 120 of the cap functions to retain the cap on the connector to prevent the cap from falling off under its own weight. Generally, a retention force greater than about 1 N is required to secure the cap to the connector. The retention force cannot be so great, however, that the first and second ends of the cap cannot move relative to the housing. That is, during actuation, the front and rear ends must be free to move backward relative to the housing to push the ferrule assembly backward, and then be able to move forward again to allow the ferule assembly to return to its forwardly-biased position.

The present invention may achieve this retention force in different ways. One approach is to have the retention portion 120 slidably contact the housing such that it moves back and forth on the connector during actuation. This may be achieved though a friction fit between the cap and the housing. To this end, the retention portion urges against the housing to provide the desired degree of friction. In this approach, the retention force should not be too high; otherwise, it may exceed the spring force that urges the ferrule assembly forward. In other words, after actuation, the ferrule assembly should return to its forwardly-biased position. If the retention force exceeds the spring force of the ferrule assembly, the ferrule assembly will remain pushed backward. A typical ferrule assembly is biased forward with minimum force of about 5 N and 7.8 N for SFF and standard connectors, respectively. Therefore, suitable retention forces range from greater than about 1 N to below about 7.6 N.

Effecting a friction fit is complicated, however, by the incompressibility of the cap. In other words, the cap of the present invention cannot rely on the elasticity of the cap material to provide the desired friction fit since the cap must be made of an essentially incompressible material. Rather, compliance is provided by introducing slots 107 that define beams 113 capable of flexing as shown in FIG. 2. These compliant beams comprise raised bumps 105, which are configured to contact the inside of the housing. The location of these raised bumps along the beams 113 is one of the factors that governs the retention force. Specifically, as the bumps are moved to the more-compliant, distal ends of the beams, the less normal force they exert against the inside of the housing when the cap is installed on the connector, thus reducing the frictional retention force. Therefore, the location of the bumps provides a convenient mechanism for tuning the retention portion to provide the desired retention force.

The retention portion 120 of the embodiment of FIG. 2 also has the benefit of being internal to the connector 101 (see FIG. 1). That is, the retention force is imparted on the inside of the connector, rather than on the outside, thereby leaving the outside of the connector 101 relatively uncluttered. This enables an outer housing 301 to be installed on the connector 101 without removing the cap 102.

Another way to provide retention force is by exploiting structure elements on the housing of the connector. For example, referring to FIG. 4, the retention portion exploits the latch 408 and shoulder 409 of the LC connector. Specifically, the retention portion 405 comprises a tab 410, which interengages the shoulder 409 on the latch 408 to secure the cap 402 to the connector 201. This allows the cap to slide over the housing but not fall off. Because this approach relies on a mechanical interconnection rather than a friction fit with the housing, compliance of the cap is not as critical as in the SC approach described above. The cap can therefore be configured to fit loosely over the connector (relative to the SC connector) such that it slides essentially frictionless over the connector housing. Consequently, there is no need for slots as mentioned above to introduce compliance, although it may be advantages to introduce them to reduce material requirements. For example, the cap 402 in FIG. 4 has a slot 407 defined in its top (exposing the latch 108).

Figure 7:
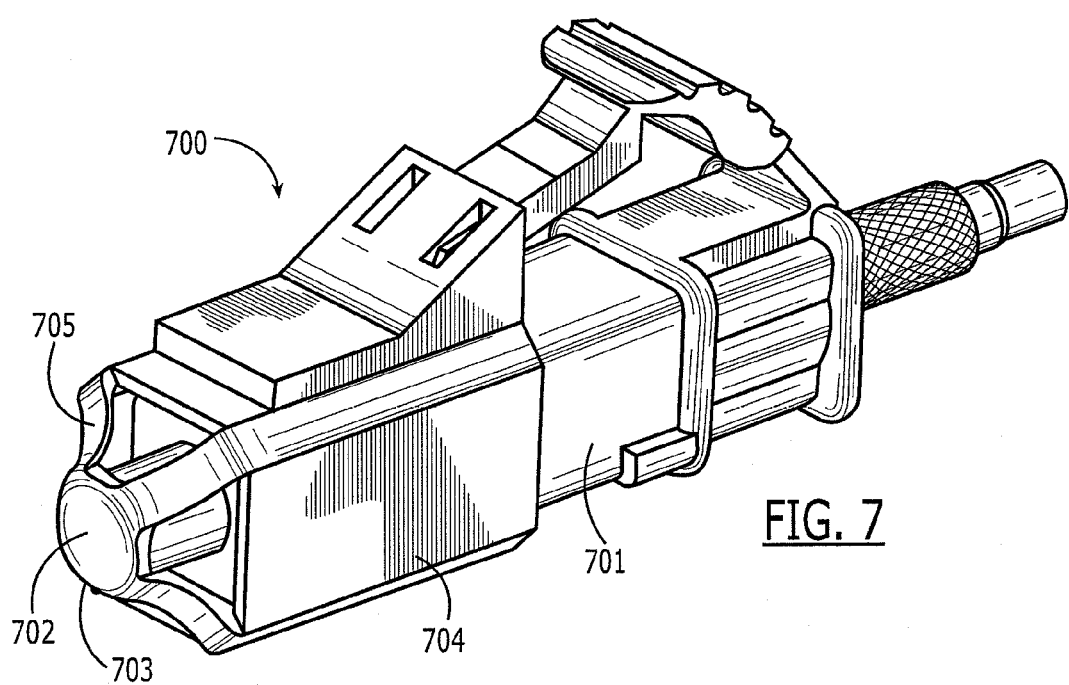
FIG. 7 shows an alternative embodiment of the cap of the present invention.

Yet another way involves employing a living hinge to allow the front and rear ends to move independently of the retention portion. Specifically, rather than having the retention portion slidably engaged with the connector housing, it may be secured to the housing with a frictional or mechanical interengagement, which exceeds the spring force of the ferrule assembly, but has a compliant member that enables the front and rear ends can move relative to the connector housing during actuation. Such an embodiment is shown in FIG. 7. As shown, the cap 702 comprises a retention portion 704 which is secured to the housing 701 and a compliant member 705 in the form of a living hinge that allows the front end 703 and rear end (not shown) of the cap to move rearward during actuation.

Still another approach to provide retention force involves contacting the ferrule rather than the housing. Specifically, referring back to FIG. 2, the raised bumps may protrude inwardly instead of outwardly. Such a configuration causes the bumps to apply pressure against the ferrule, therefore providing a friction fit between the bumps and the ferrule. Because this approach involves contacting the ferrule, which is regarded as relatively delicate, the other approaches mentioned above tend to be more preferred, although this approach may be preferable in situations in which contact with the housing is difficult or the ferrule is particularly robust.

The present invention also provides for a family of protective caps for different connectors that standardize the connectors' unactuated length and front-end geometry. In one embodiment, the family of caps comprises different caps with each different cap corresponding to one of the different connectors. As described above, each cap also comprises at least a front end defining a cavity for receiving the ferrule and having an outer surface defining at least part of a front-end geometry, a back end defining an opening through which the ferrule is received and a perimeter around the opening, the perimeter configured to contact the holder, the front and back end being unitary such that any rearward force on the front end is transferred to the back end and through the perimeter to the holder, and a retention portion for contacting the housing to secure the cap to the housing.

A critical feature of the family of caps is that the distance from the front end to back end for each different cap is different, but the front-end geometry of each different cap is essentially the same. The difference in length of the different caps is calculated to accommodate the difference in the length of the different connectors. For example, referring to FIGS. 5 and 6, cross sections of the SC type connector/cap assembly and the LC type connector/cap assembly are shown, respectively. These drawings are essentially in common scale such that one can see that the LC connector 401 has a shorter un-actuated length l than the un-actuated length l' of the SC connector 101. Nevertheless, the overall length of each assembly is the same because cap 402 is longer to make up the difference. Furthermore, as mentioned above, each assembly has a common front-end geometry 103, 403. Because the different connectors with their corresponding cap have a common unactuated length and a common first end geometry, they are received in a common crimp tool.

It should be understood that the description above provides illustrative embodiments of the present invention and other embodiments exist.

What is claimed is:

1. A method of terminating a fiber in a connector having a front and rear orientation, a housing, a clamping mechanism in said housing, and a ferrule assembly forward of said clamping mechanism and comprising a holder and a ferrule extending from said holder, said method comprising:
   selecting a cap from a family of caps for different types of field-installable connectors, each different type of field-installable connector having a different unactuated length and a different front-end geometry, each different cap corresponding to one of said different types of field-installable connector, and comprising at least a front end having an outer surface defining at least part of said certain geometry, a cavity for receiving said ferrule, and a back end defining an opening to said cavity through which said ferrule is received, and wherein the distance from said front end to back end for each different cap is different, but said certain geometry of each different cap is essentially the same, wherein said different connectors with their corresponding cap have a common unactuated length;
   covering said ferrule with said cap;
   inserting a fiber into said clamping mechanism from the rear of the connector; and while said cap is on said ferrule, actuating said clamping mechanism to secure said fiber to said connector by urging said cap rearward relative to said clamping mechanism, said actuating being performed with a crimp tool having a first die on one opposing arm to receive said cap and a second die on the other opposing arm to interengage a plunger, said first die being configured with a receptacle of said certain geometry.

2. The method of claim 1, wherein said ferrule assembly is forwardly biased in said housing such that, when said cap is urged rearward, it pushes said ferrule assembly rearward and, after actuation, said ferrule assembly returns to its forwardly-biased position.

3. The method of claim 1, wherein said cap transmits essentially no force to said ferrule during actuation.

4. The method of claim 1, wherein said cap comprises a perimeter around said opening, said perimeter configured to contact said holder, said front and back end being unitary such that any rearward axial force on said front end is transferred to said back end and through said perimeter to said holder.

5. The method of claim 1, wherein said cap also comprises a retention portion for contacting said housing to secure said cap to said housing.

6. The method of claim 5, wherein said cap slides along said housing during actuation.

7. A method of terminating a fiber for a family of different connectors, each different connector having a front and rear orientation, a housing, a clamping mechanism in said housing, and a ferrule assembly forward of said clamping mechanism and comprising a holder and a ferrule extending from said holder, each different connector having a different unactuated length and a different front-end geometry, said method comprising:
   selecting a first cap from a family of caps, each different cap corresponding to one of said different connectors and comprising at least a front end having an outer surface defining at least part of a certain geometry, a cavity for receiving said ferrule, and a back end defining an opening to said cavity through which said ferrule is received, and wherein the distance from said front end to back end for each different cap is different such that said different connectors with their corresponding cap have the same certain unactuated length;
   disposing said first cap on a first connector of said different connectors, wherein said first connector with said first cap has said certain unactuated length;
   inserting a fiber into said clamping mechanism from the rear of said first connector; and
   while said first cap is on said first connector, actuating said clamping mechanism to secure said fiber to said first connector using a crimp tool having a first die on one opposing arm having a receptacle with said certain geometry to receive said first cap and a second die on the other opposing arm to interengage a plunger of said first connector.

8. The method of claim 7, further comprising:
   selecting a second cap from said family of caps for a second connector of said different connectors, said first and second connectors being different;
   disposing said second cap on said second connector, wherein said second connector with said second cap has said certain unactuated length;
   inserting a fiber into said clamping mechanism from the rear of said second connector; and
   while said second cap is on said second connector, actuating said clamping mechanism to secure said fiber to said second connector using said crimp tool with said first die to receive said second cap.

9. The method of claim 8, wherein said first and second caps transmit essentially no force to said ferrule during actuation.

10. The method of claim 9, wherein each cap of said family of caps comprises a perimeter around said opening, said perimeter configured to contact said holder, said front and back end being unitary such that any rearward axial force on said front end is transferred to said back end and through said perimeter to said holder.

11. The method of claim 7, wherein said ferrule assembly is forwardly biased in said housing such that, when said cap is urged rearward, it pushes said ferrule assembly rearward and, after actuation, said ferrule assembly returns to its forwardly-biased position.

12. The method of claim 7, wherein each cap of said family of caps comprises a retention portion for contacting said housing to secure said cap to said housing.

13. The method of claim 12, wherein each cap slides along said housing during actuation.

\* \* \* \* \*